United States Patent
Docherty et al.

(10) Patent No.: US 10,289,739 B1
(45) Date of Patent: May 14, 2019

(54) SYSTEM TO RECOMMEND CONTENT BASED ON TRENDING SOCIAL MEDIA TOPICS

(71) Applicant: ThinkAnalytics, El Segundo, CA (US)

(72) Inventors: Peter Docherty, Glasgow (GB); Ewen Cattanach, Woodbridge (GB); Bruce Zhang, Glasgow (GB); David Scott, Glasgow (GB); Shahad Ahmed, Glasgow (GB); Alan Ryman, Glasgow (GB); Asim Ullah, Glasgow (GB); Darren Callaghan, Glasgow (GB); Gordon McIntyre, Glasgow (GB)

(73) Assignee: ThinkAnalytics, El Segundo, CA (US)

( * ) Notice: Subject to any disclaimer, the term of this patent is extended or adjusted under 35 U.S.C. 154(b) by 359 days.

(21) Appl. No.: 14/706,902

(22) Filed: May 7, 2015

Related U.S. Application Data

(60) Provisional application No. 61/989,817, filed on May 7, 2014.

(51) Int. Cl.
   *G06F 7/00* (2006.01)
   *G06F 17/30* (2006.01)

(52) U.S. Cl.
   CPC .............................. *G06F 17/30867* (2013.01)

(58) Field of Classification Search
   CPC ......... G06F 17/30268; G06F 17/30867; G06F 17/30699; G06F 17/3064
   USPC ........ 707/706, 754, 755, 758, 737, 752, 769
   See application file for complete search history.

(56) References Cited

U.S. PATENT DOCUMENTS

| | | | |
|---|---|---|---|
| 8,370,348 B1 * | 2/2013 | Reilly | G06Q 30/02 707/731 |
| 2012/0166438 A1 * | 6/2012 | Wu | G06F 17/3064 707/737 |
| 2015/0026596 A1 * | 1/2015 | Tseng | H04L 65/403 715/753 |
| 2015/0046436 A1 * | 2/2015 | Li | G06F 17/3053 707/723 |

* cited by examiner

*Primary Examiner* — Md I Uddin
(74) *Attorney, Agent, or Firm* — Rowan Tels LLC

(57) ABSTRACT

A content recommendation system includes a content recommendation engine, a trender including a first trender interface to a social media platform and a second trender interface to a search engine, wherein the trender includes an ordered chain of term enhancers to enhance trending terms received via the first trender interface into enhanced terms. The search engine is adapted to receive the enhanced terms via the second trender interface and to form a search result set for the enhanced terms, and the search engine is coupled to provide the search result set to the content recommendation engine.

5 Claims, 14 Drawing Sheets

SYSTEM TO RECOMMEND CONTENT BASED ON TRENDING SOCIAL MEDIA TOPICS

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

Figure 1:
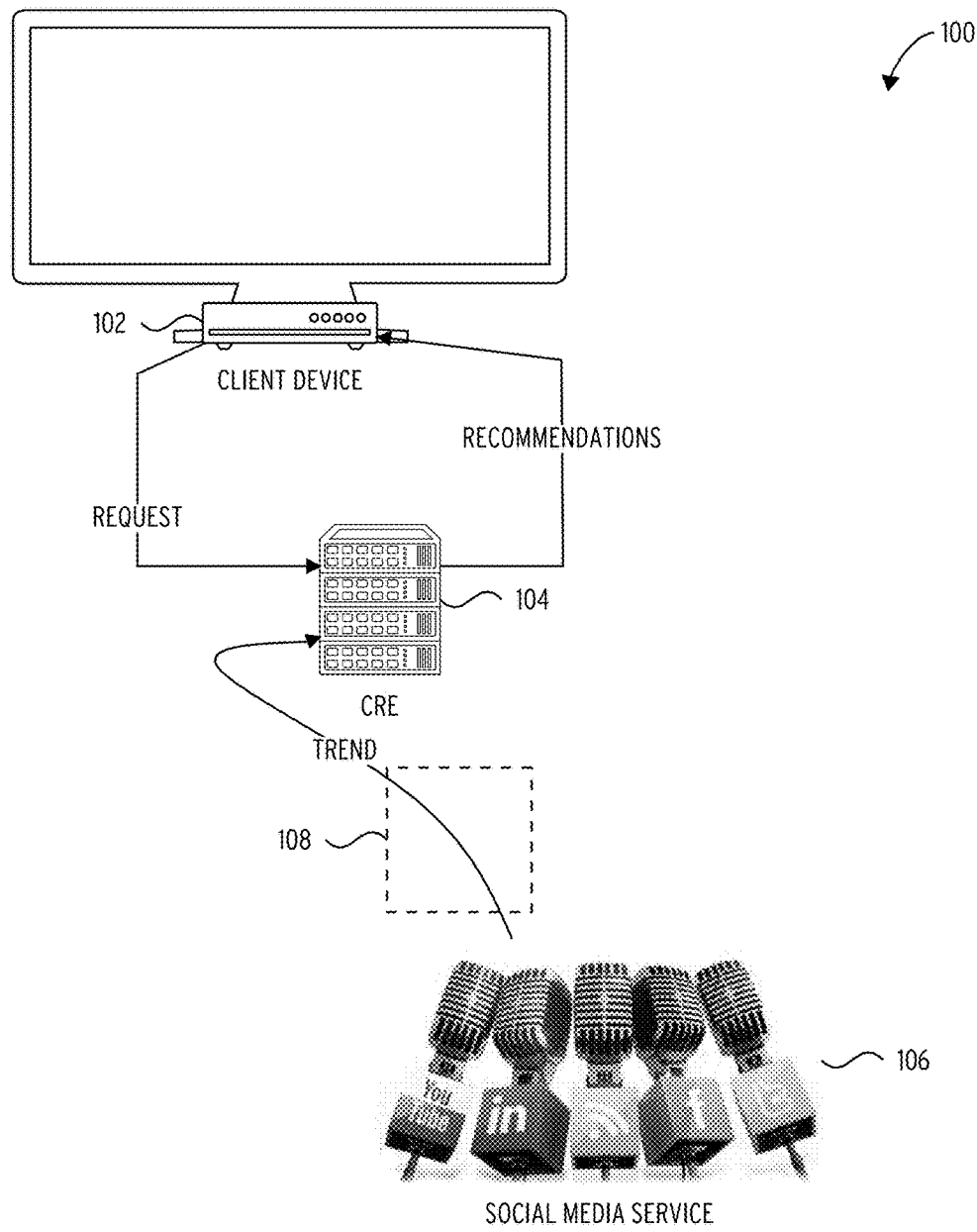
FIG. 1 illustrates an embodiment of a content recommendation system utilizing social media trends 100.
Figure 2:
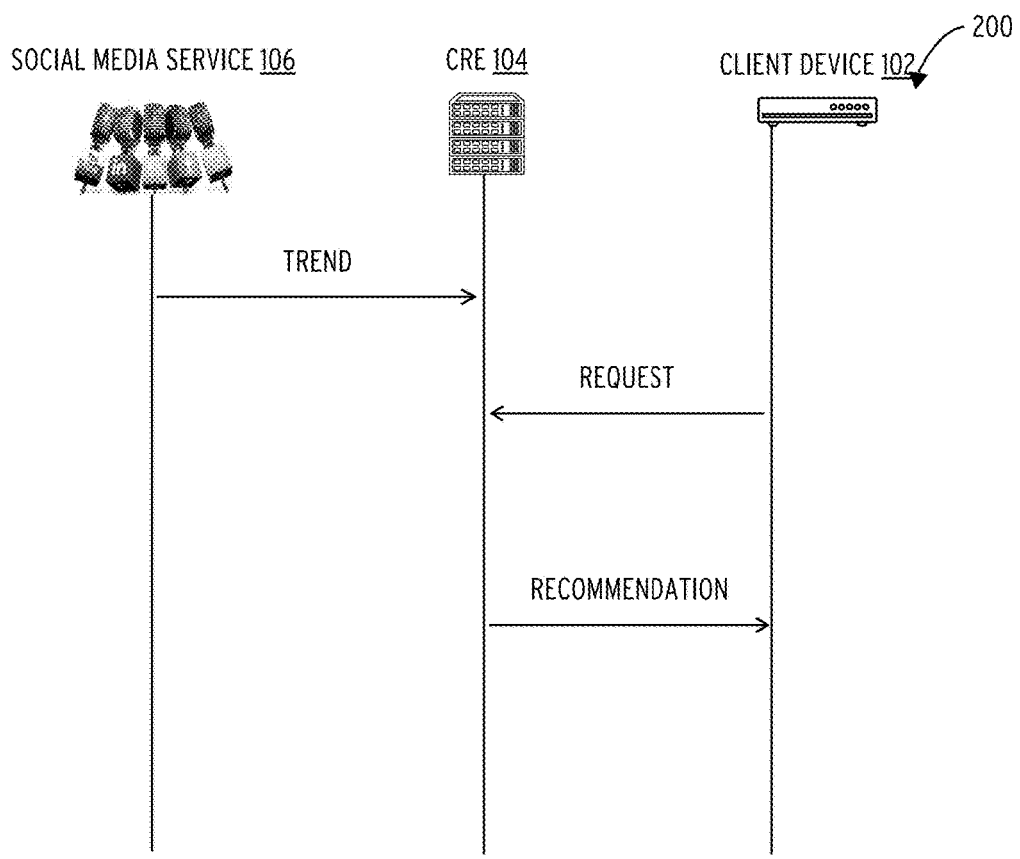
FIG. 2 illustrates interactions for an embodiment of a social media based content recommendation process 200.
Figure 3:
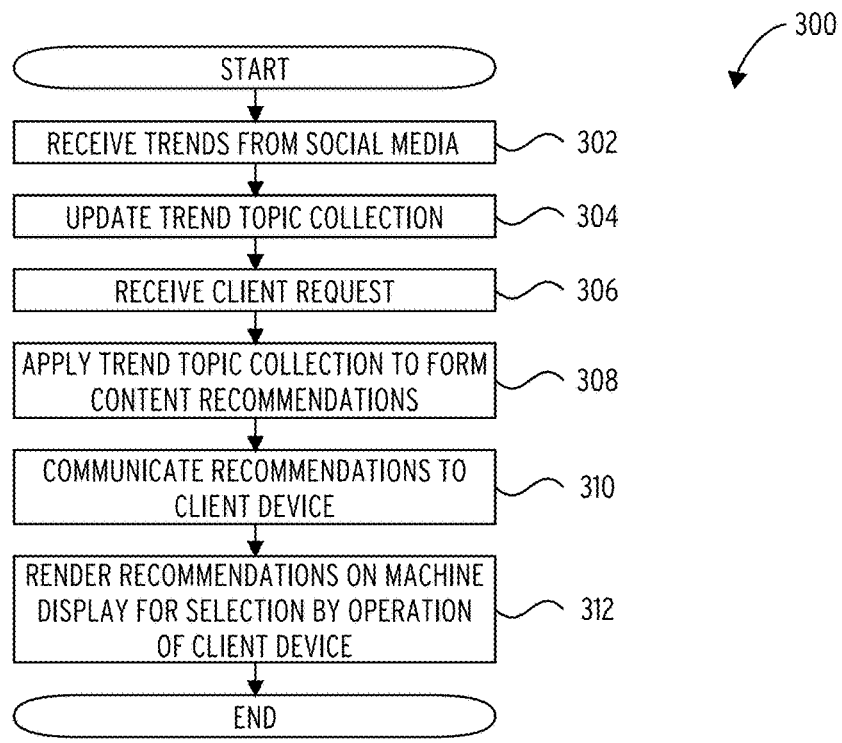
FIG. 3 illustrates an embodiment of a social media influenced content recommendation process 300.

FIG. 1 illustrates an embodiment of a content recommendation system utilizing social media trends 100. FIG. 2 illustrates an embodiment of a social media based content recommendation process 200. FIG. 3 illustrates an embodiment of a social media influenced content recommendation process 300.

The system comprises client device 102, content recommendation system 104, and social media service 106. Content recommendation system 104 receives a trend (block 302) from social media service 106 and in response updates a collection of trending topics (block 304). The content recommendation system 104 receives a request (block 306) from client device 102 and in response applies trend topics to form content recommendations (block 308). The client device 102 receives recommendations from the content recommendation system 104 (block 310) and in response renders the recommendations to a user of the device (block 312).

Figure 4:
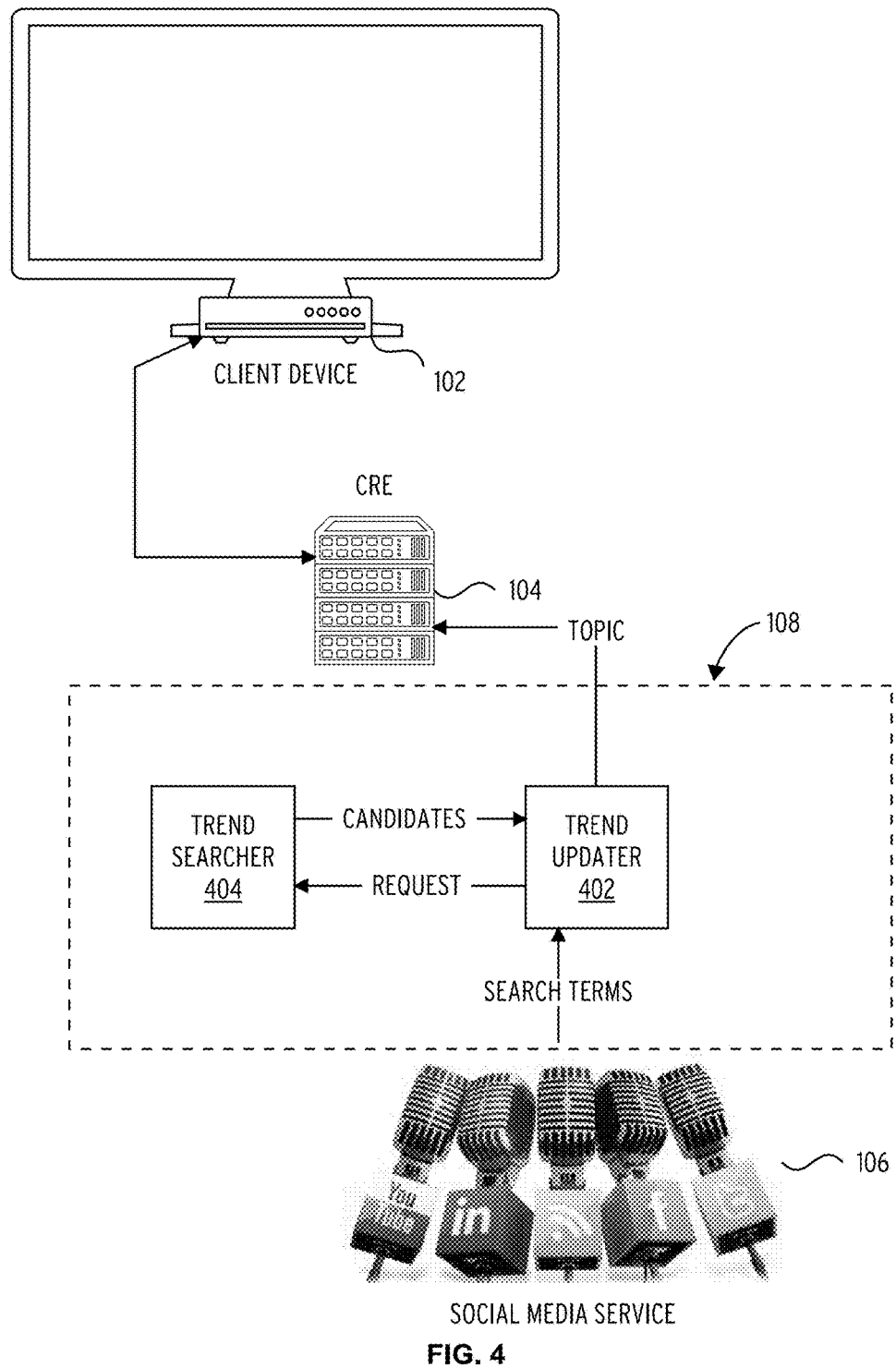
FIG. 4 illustrates an embodiment of a content recommendation system utilizing social media trends 100.

The content recommendation system 104 may interoperate with the social media service 106 via a trend detection system 108 described in more detail in conjunction with FIG. 4.

Figure 5:
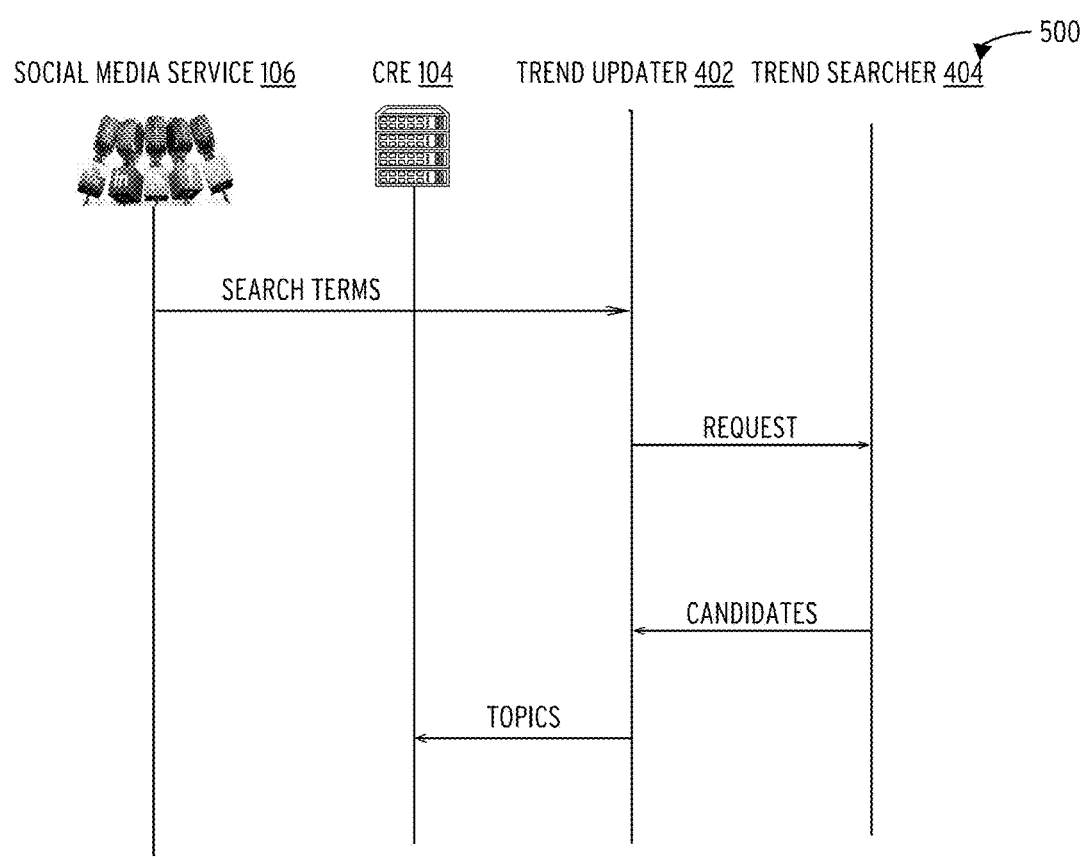
FIG. 5 illustrates interactions for an embodiment of a social media based content recommendation process 500.
Figure 6:
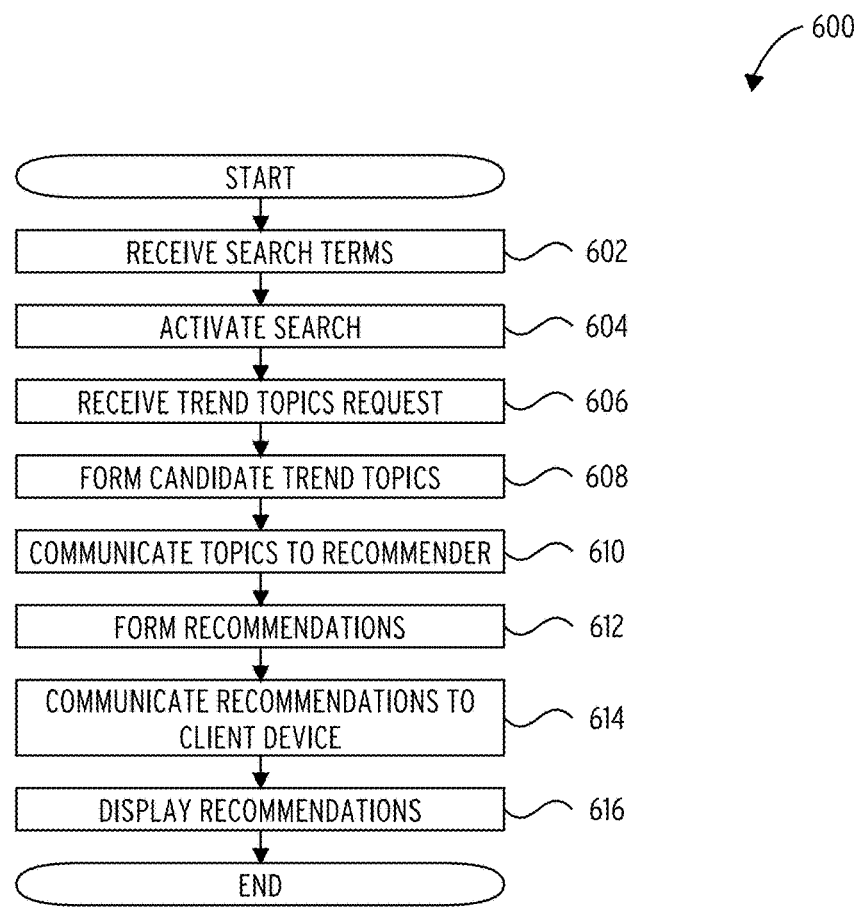
FIG. 6 illustrates an embodiment of a social media influenced content recommendation process 600.

FIG. 4 illustrates an embodiment of a trend detection system 108. FIG. 5 illustrates an embodiment of a social media based content recommendation process 500. FIG. 6 illustrates an embodiment of a social media influenced content recommendation process 600.

The trend detection system 108 comprises recommender trend updater 402 and trend searcher 404. The trend updater 402 receives search terms (block 602) from social media service 106 and in response activates a search utilizing the search terms (block 604). The trend searcher 404 receives a request (block 606) from the trend updater 402 and in response forms a set of candidate topics based on the search terms in the request (block 608). The trend searcher 404 receives trend candidates from trend searcher 404 and in response signals the content recommendation system 104 of new candidate topics (block 610). The content recommendation system 104 receives one or more trend topics from the trend updater 402 and in response forms recommendations based on the topic (block 612). The content recommendation system 104 communicates the recommendations to the client device 102 (block 614) and the client device 102 operates a machine display device to display the recommendations to a viewer (block 616).

Figure 7:
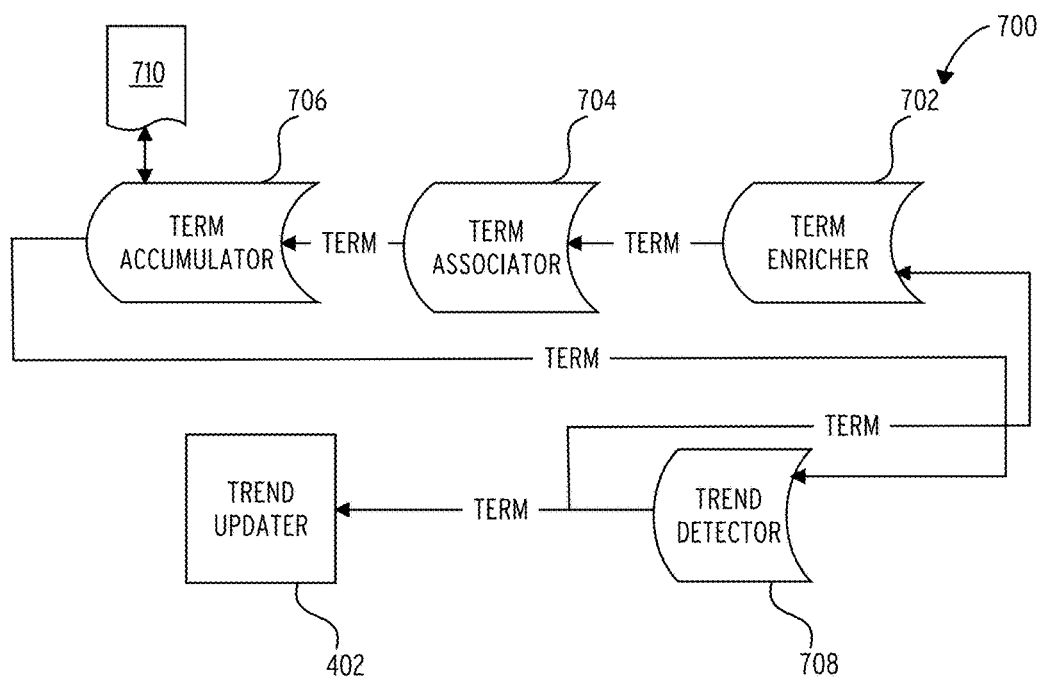
FIG. 7 illustrates an embodiment of a social media trend update system 700.
Figure 8:
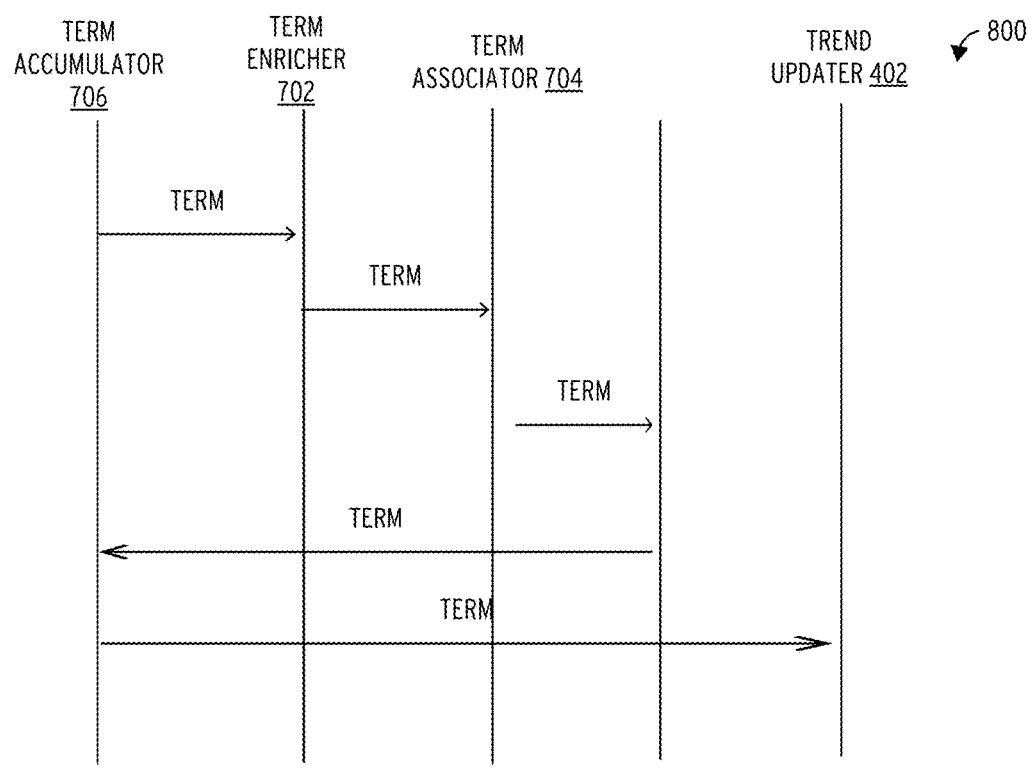
FIG. 8 illustrates an embodiment of a social media trend update process 800.
Figure 9:
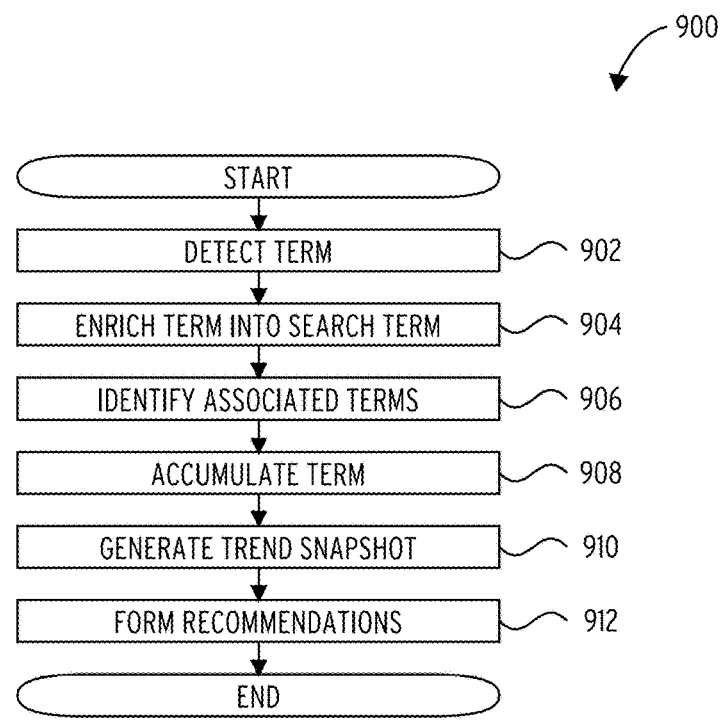
FIG. 9 illustrates an embodiment of a social media trend update process 900.

FIG. 7 illustrates an embodiment of a social media trend update system 700. FIG. 8 illustrates an embodiment of a social media trend update process 800. FIG. 9 illustrates an embodiment of a social media trend update process 900.

The social media trend update system 700 comprises term enricher 702, term associator 704, term accumulator 706, trend detector 708, and trend updater 402. A term that is trending on social media is detected by the trend detector 708 (block 902) and the term enricher 702 transforms the term (e.g., trend topic) into search terms (block 904). The term associator 704 is operated on the enriched search terms (block 906) to check for terms associated with the search terms.

The enriched term is buffered (e.g., LRU) by the term accumulator 706 (block 908). The trend detector 708 receives search terms from the term accumulator 706 and generates a snapshot of current trends (block 910). The snapshot is processed into recommendation topics as previously described (block 912).

Figure 10:
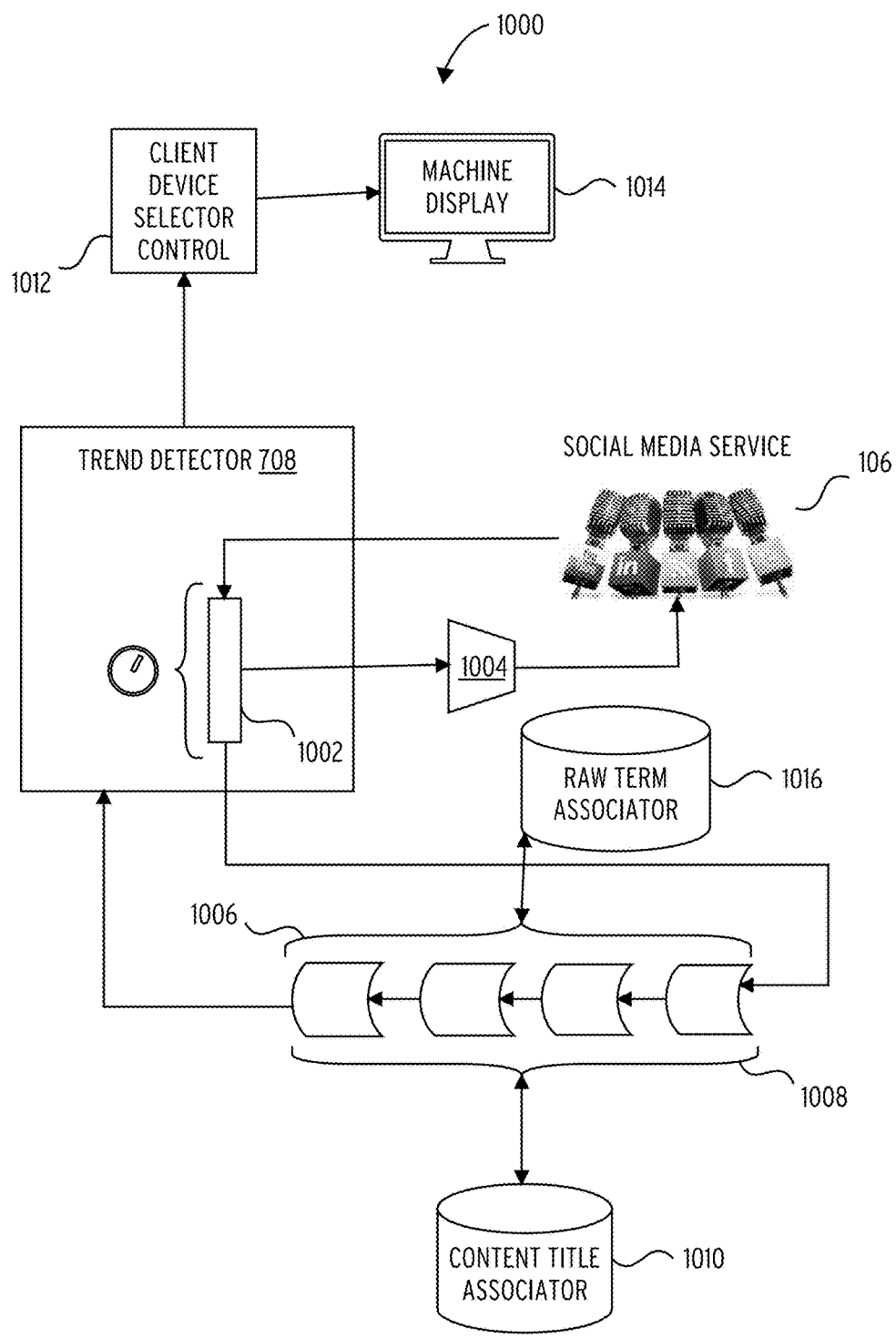
FIG. 10 illustrates an embodiment of a client device selector control system 1000.

FIG. 10 illustrates an embodiment of a client device selector control system 1000.

Multiple trend detectors (one trend detector 708 is illustrated) may periodically generate a snapshot of trend data from their associated service provider (e.g. Social media service 106, an anonymous Twitter trends for a specific location). Each trend detector 708 may filter trends from an associated social media service 106 by operating the service provider's application program interface (API), with appropriate configurable parameters (e.g., for Twitter, 'woeID'). The trend detector 708 may poll the social media service 106 on a scheduled basis to identify and record ('capture') current trends. Each trend detector 708 may have an associated unique ID for tracking the source of search terms.

The trend data snapshot may be generated in manners known in the art, for example by operation of a time-framing snapshot logic 1002 to control a switch 1004 on acquisition of the trend signals from the social media service 106.

The following example illustrates example logic to capture trending topics from Twitter in one embodiment:
   Twitter twitter=new TwitterTemplate( );

List trends=twitter.searchOperations( ).getLocalTrends (woeid).getTrends( );

A chain of term enrichment transformations (transform chain 1006) may be applied to perform, for example, association, cleanse, word separation, and context search. The result is to capture and process a web accessible Twitter feed (XML/RSS) and add extracted and enriched terms as title searches to the local or global set (content title associator 1010).

The trend detector 708 could be useful for a marketing department to provide a file of content titles they want to push that week. The search service logic may automatically identify when titles matching a current social media trend are available and filter/currate them for a particular viewers.

In one embodiment the trend detector 708 enriching each trend topic into one or more search terms by applying a chain of zero or more term enrichment modules (transform chain 1006). The transform chain 1006 may be implemented as an ordered list of modules invoked by the trend detector 708, which may also receive their output.

Each term enrichment module of the transform chain 1006 may implement a standard interface to and from the trend detector 708. The interface communicates whether further processing may be performed on terms and operates an interruptor 1008 on the transform chain 1006. For example, an 'association' enrichment module may expand the Twitter hashtag '#bbcHIGNFY' to a title search for 'Have I Got News For You' and 'Have I Got a Bit More News For You'. This is sufficient and complete enough to stop enriching this term further (sufficient for purposes of searching for the title accurately). The interface may also communicate the context of a search term in the form of a search type, e.g. 'person', 'word' or 'title'.

Enrichment may be considered complete and the interruptor 1008 engaged if the search type becomes 'title' or 'person', but not necessarily 'term'. This way if association is at the top (first or closer to first in the chain of processing) of the transform chain 1006 and '#bbcHIGNFY' is correctly associated to a 'title' search, then that term would stop progressing down the transform chain 1006.

Trends may have associated terms that are better candidates as search terms later on. For example the raw term may be in an abbreviated or coded form, or may have other titles that could easily be associated.

An 'association' type enrichment module may also be operated to associate terms with 'nothing'—i.e. to exclude terms from search. For example, topics about the 'zeitgeist' (e.g "#ThingsICantLiveWithout") may not be used as search terms.

In one embodiment an association table (raw term associator 1016) that maps a known raw term with one or more appropriate terms provides this mapping capability. For example the hashtag '#bbcHIGNFY' may be mapped to the string "Have I Got News for You" and "Have I Got a Bit More News for You" (with a search type indicating 'title'). If an association for #bbcHIGNFY exists, then the correct title(s) are returned and term enrichment is indicated to be complete by operation of the interruptor 1008. If an association for #ThingsICantLiveWithout exists, but has no mapped terms, then that term may be considered excluded and term enrichment is indicated as complete by operation of the interruptor 1008. If an association is not found in the mapping, then processing proceeds to the next enrichment module (if any) in the transform chain 1006.

The trend detector 708 may have the ability to add to a set of associated terms via a web based command console, or to learn from a recognized feed. This enables flash trends to be quickly identified with one or more search term, title, or exclusion. All the trend detector 708 may utilize a same data source for their 'association' term enrichers.

A 'cleanse' type enrichment module may be utilized in the transform chain 1006. Trend terms might be represented with mark-up, such as hash tags (e.g. #LadyGaGa). A cleanse type enrichment module may be configurable to remove any special markup.

A 'word separation' type enrichment module may be utilized in the transform chain 1006. Multiple word terms may be concatenated without whitespace (e.g "JoeFrazier"). A word separation type enrichment module may expand such terms by adding a white space (e.g. "Joe Frazier").

A 'context search' enrichment module may be utilized in the transform chain 1006. This module operates on an original raw trend term and executes a further search using a social media vendor's API to retrieve the top N results comprising the term. For example, on Twitter this module would operate to retrieve the top N-tweets containing the trend term. Analysis of the returned results (e.g. stop word removal and frequency analysis) yields a further tier of potential terms, along with the original term, that may be used as a source of enriched terms. Selected ones of the enriched terms may be further processed through the transform chain 1006.

Every enriched search term may be passed through the trend detector 708 associated term accumulator 706. The term accumulator 706 is a buffer for enriched search terms and allows the trend detector 708 to maintain a larger list of search terms than those for the original trends acquired from the social media service 106.

The term accumulator 706 may store enriched search terms in a fixed size LRU (least recently used) queue memory structure. If an added term is already in the queue it is moved to the front of the queue and no further action will happen. If the added term is not in the queue, then the oldest term at the tail of the queue may be removed, generating an "Announce Expire Term" message, and the new term added, generating an "Announce Add Term" message that may be consumed by multiple content recommendation system 104 listener systems.

This process will age out older terms whilst keeping more than the number returned by Twitter or another social media service 106, and limiting the number of messages placed on the queue. The term accumulator 706 may be general purpose for use with any social media service 106 and/or trend detector 708.

A reset signal may be generated when the term accumulator 706 has lost state, and all terms in the queue may be cleared. Soon after a reset command the term accumulator 706 should be re-populated with new search terms. For example, if a trend detector 708 is restarted and the LRU queue in the term accumulator 706 is empty, the 'reset' command may be generated once current trend terms have been re-captured by the trend detector 708, enriched, and re-populated into the LRU queue. The 'reset' command may be generated only if the term accumulator 706 recognizes that the queue was empty beforehand and there are sufficient newly discovered enriched search terms to dispatch immediately afterwards. In some cases the queue could be repopulated by loading existing terms from a more persistent 'Trend Search Record' table (slower-evolving trend record table 710).

Figure 11:
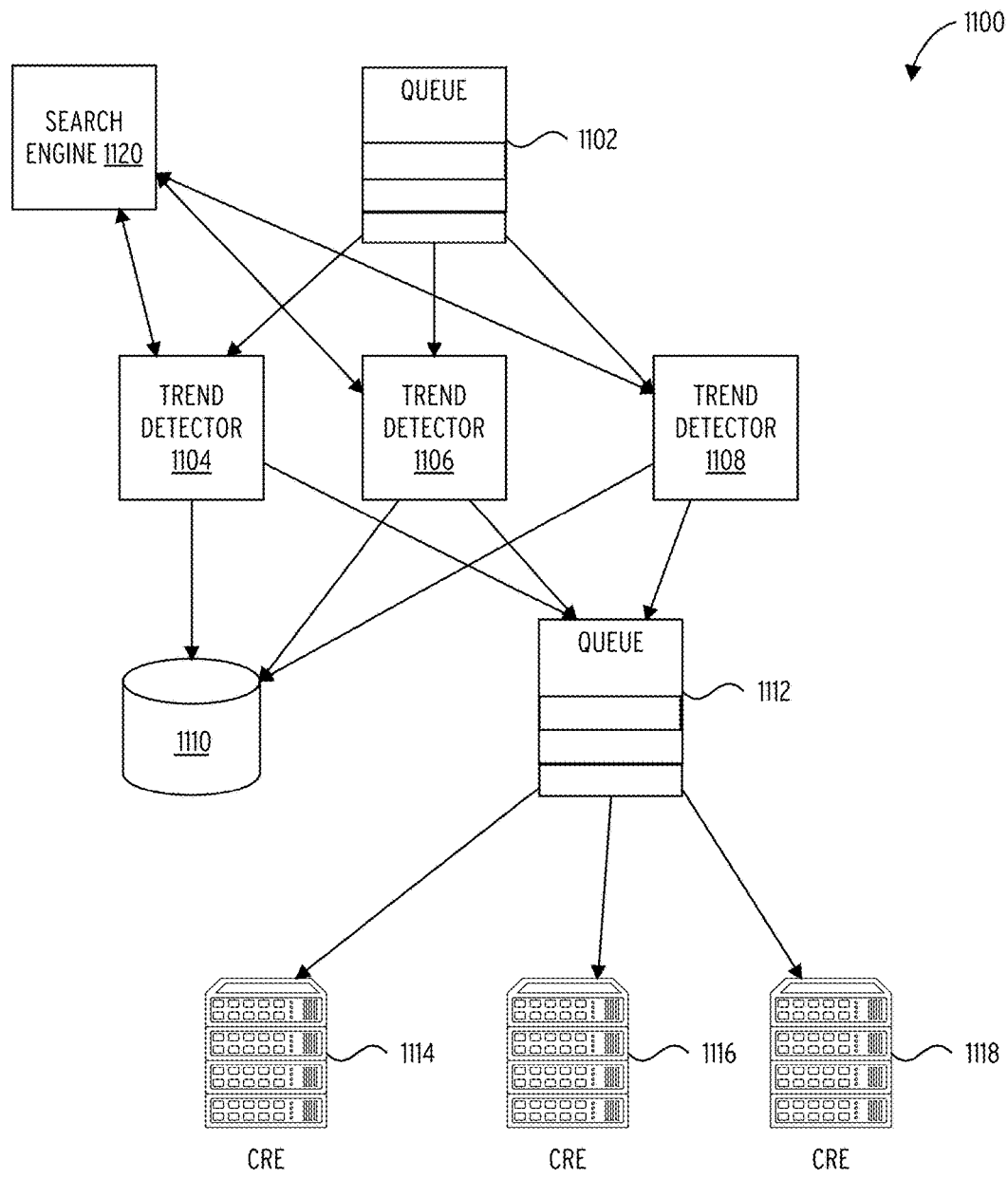
FIG. 11 illustrates a system utilizing three content recommendations systems 1100.

FIG. 11 illustrates a system utilizing three content recommendations systems 1100. At the top is an asynchronous point-to-point queue 1102 comprising trend message control signals. Three trend control messages are dispatched from the asynchronous point-to-point queue 1102, influencing each of trend detector 1104, trend detector 1106, and trend detector 1108, which each in turn operate a search engine 1120 and alter an associator 1110 and a queue 1112. The queue 1112 in turn controls the CRE 1114, CRE 1116, and CRE 1118.

In this example three trending topics (e.g., tuple symbol sequences) have been submitted to the asynchronous point-to-point queue 1102 by the social media service 106:

"Have I Got News for You", "title"

"Ian Hislop", "term"

"xfactor", "term"

The trend detector 1104 removes the message "Have I Got News for You" from the asynchronous point-to-point queue 1102 and configures and operates the search engine 1120 on a content-associated "title" field of one or more content attribute associators (not shown).

Results returned from the search engine 1120 are applied by the trend detector 1104 to alter the configuration of the associator 1110. The trend detector 1104 also inserts a message in the queue 1112 comprising details of the re-configuration (e.g., new records) of the associator 1110.

In parallel with these operations by trend detector 1104, the trend detector 1106 removes the message "Ian Hilsop" from the asynchronous point-to-point queue 1102 and configures and operates the search engine 1120 on a content-associated "term" field of one or more content attribute associators (not shown). Results returned from the search engine 1120 are applied by the trend detector 1106 to alter the configuration of the associator 1110. The trend detector 1106 also inserts a message in the queue 1112 comprising details of the re-configuration (e.g., new records) of the associator 1110.

In parallel with these operations by trend detector 1104 and trend detector 1106, the trend detector 1108 removes the message "xfactor" from the asynchronous point-to-point queue 1102 and configures and operates the search engine 1120 on a content-associated "term" field of one or more content attribute associators (not shown). Results returned from the search engine 1120 are applied by the trend detector 1108 to alter the configuration of the associator 1110. The trend detector 1106 also inserts a message in the queue 1112 comprising details of the re-configuration (e.g., new records) of the associator 1110.

The CRE 1116, CRE 1118, and CRE 1114 are each activated via messages from the queue 1112. They each operate the associator 1110 to obtain the updates re-configured by the trend detectors.

The asynchronous nature of this machine system does not necessarily preserve event order, so it is possible the CREs will be activated by events from the queue 1112 in a different order from which they are consumed from the asynchronous point-to-point queue 1102.

One optimization is to generate a message for each term candidate generated by the trend detectors, with each of the CREs then responding to this message by updating their internal memory structure rather than executing a selective query on the associator 1110.

This may work as follows:

1. A trend detector 1104 reads and removes a message from the asynchronous point-to-point queue 1102 and operates the search engine 1120 to return a result set (candidates) for that search term.

2. The trend detector 1104 inserts those candidates into the configuration of the associator 1110.

3. The trend detector 1104 generates one message for each of those candidates with descriptive information about each candidate content item.

4. All CREs receive each of these messages and directly update their internal memory structures.

The message header may be used to set the type of change—i.e. a removal or an addition.

The search engine 1120 may utilize a dedicated search index for each content source in a plurality of languages to obtain a list of candidates for each term. The search engine 1120 may support each of the following search types:

title (title match)

term (within title or description)

people

For example, the phrase "Rise of the Planet of the" may have trended in the past, referring (presumably) to the "Rise of the Planet of the Apes" film. The original "Planet of the Apes" may have played on More4 that weekend and whilst this topic was trending so would be a positive and relevant hit. The design may allow such a mapping to take place.

The following embodiment of a machine memory association table may persist the social media candidate set in the associator 1110, and act as a central resource for multiple CREs. Each CRE may utilize an in-memory storage of this set so a social media candidate set service can use it to create a candidate set specific to a user.

field: description:type

Content Item ID: The content item ID: PRI

Content Source ID: The content source ID the content item is on: PRI

TrendService ID: The original source of this candidate (e.g. UK Twitter Trends or Facebook) as a bit array for efficient filtering: INDEX Search Term: The search term used to acquire this candidate and used for partial adding and removing of in memory structures: INDEX Original Trend Term: The original trending term which resulted in the above search term (useful for reasoning).

Entry Date: The date this candidate was added—useful if an age out strategy for entries in the associator 1110 is utilized.

In one embodiment the following machine memory organization records when search terms arrive and how long they have existed for. This is useful in the event a search results includes no candidates, the knowledge of that search term exists for future ingests, and the original trend term is required to repopulate the equivalent field in the social media candidate set.

field: description: type

TrendService ID: The original source of this candidate (e.g. UK Twitter Trends or Facebook) as a bit array for efficient filtering: PRI Search Term: The search term used to acquire this candidate and used for partial adding and removing of in memory structures: PRI Original Trend Term: The original trending term which resulted in the above search term (useful for reasoning): PRI Search Type: The type of the search required (e.g. person, title, word): PRI Entry Date: The date the most recent search term was added If the message is for a new search term then an entry may be added to the trend search record and a search made using the trend search indices for each content source ID. The associator 1110 may be updated with the results of the search for that term and type. A message may then be placed on the queue 1112 to indicate new candidates exist for the search term/trendservice id combination.

If the message is for the removal of a search term, then the entry in the associator 1110 may be removed along with all rows in the social media candidate set table with that term and TrendService ID. A message may then be placed on the queue 1112 to indicate candidates may be removed for the search term/trendservice id combination.

All rows within the social media candidate set schema with that TrendService ID may be considered out of date and rebuilt over a short time. Ultimately all these candidates may be removed from the schema that are associated with this TrendService ID. After removing candidates, a message may be placed on the queue 1112 to indicate candidates may be removed with that TrendService ID. This process may be utilized on a fresh start of a trend detector.

The contents of the social media candidate set table of the associator 1110 may be stored in memory so it may be used to create a conventional candidate set for a particular user for recommendations by the CREs.

It is possible a content item id/content source id will be shared by more than one Original Trend Term and Trend-Service ID. Therefore the in memory structure of the CREs may store these in a set per content item/content source id association.

A 'refresh' process may be implemented to instruct a CRE to reload all candidates for a particular content source ID from the social media candidate set table and replace existing candidates for that content source id in the in-memory structure. This may not be command driven, but rather synchronously executed with 'refresh' metadata.

The social media candidate set may be under constant flux and require near on-demand updating. Rather than loading everything from the database on a regular schedule, the social media candidate set service may listen to the queue 1112 for update messages.

A New Candidates Refresh Command may cause the CRE to query the social media candidate set which have the specified Search Term and TrendService ID and add the resulting candidates to their in-memory structure. A Removed Candidates Refresh Command may cause a CRE to remove candidates with the specified Search Term and TrendService ID from their in-memory structure. An Expired Candidates Refresh Command may cause a CRE to remove all candidates with the specified TrendService ID from their in-memory structure.

Figure 12:
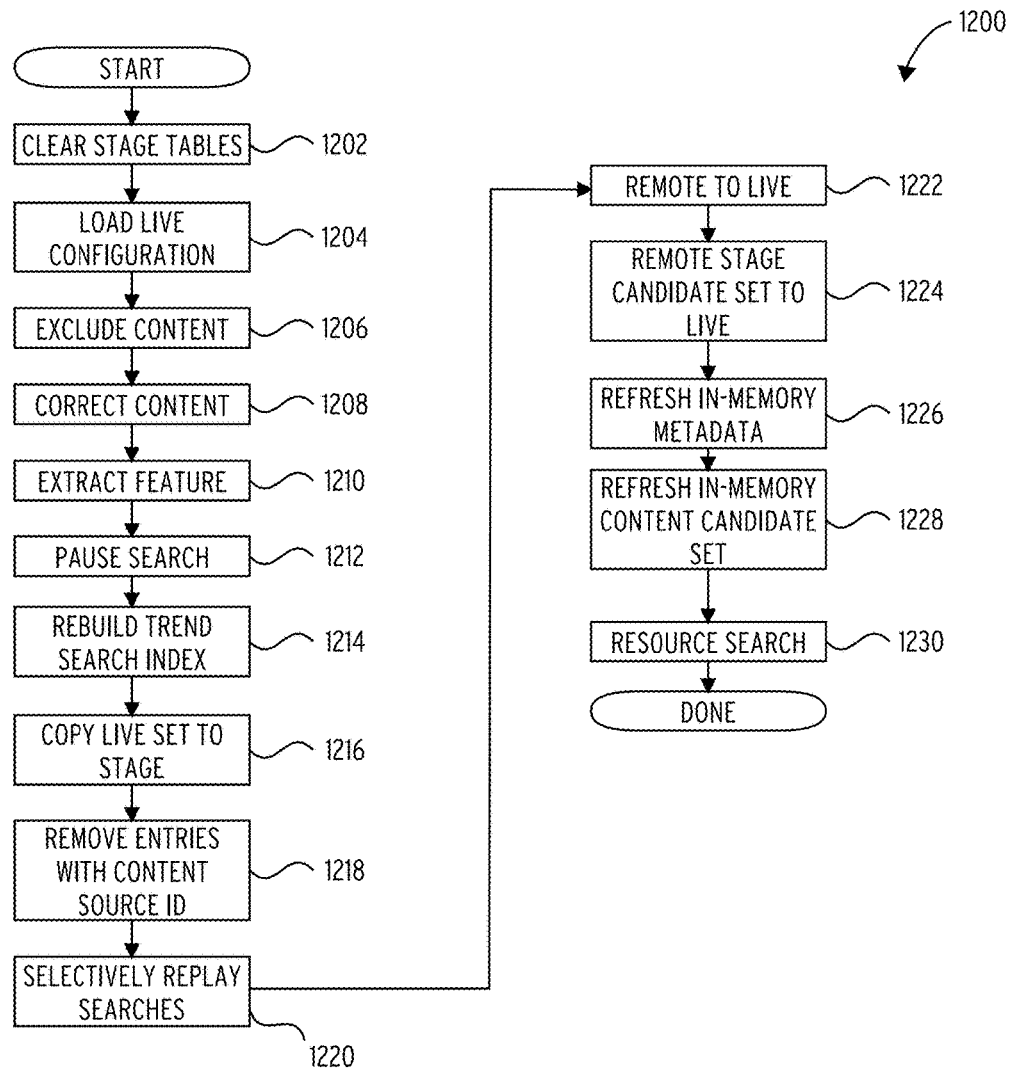
FIG. 12 illustrates an embodiment of a stage and promote to live pattern for a social media trend/content associator 1200.

A feeder queue may be utilized to include search terms no longer relevant which may be used to live update the associator 1110 and in-memory structures of the CREs. The trend detectors may operate the search engine 1120 to perform a new search for every search term identified with a specific content source id and replace the contents of the social media candidate set table of the associator 1110. The full table update may be performed using a stage and promote to live pattern which the flowchart in FIG. 12 illustrates in one embodiment. The in-memory candidate set structure may implement a 'refresh' mechanism to reload all data from the database whenever a conventional 'refresh' metadata is called.

The CRE's may implement a recommendation type (RecommendationType. SOCIALMEDIA_RECOMMENDATIONS) which accepts a parameter the value of which defines one or more TrendService IDs the recommendations may come from.

FIG. 12 illustrates an embodiment of a stage and promote to live pattern for a social media trend/content associator 1200.

The staging tables are cleared (block 1202) and new candidate set configuration loaded (block 1204), with exclusions applied (block 1206) and corrections applied (block 1208). The system may perform feature extraction (block 1210) on updated social media trends and may asset a control to pause the operation of the search engine (block 1212). The trend search index is rebuilt (block 1214) from the staged configuration and the live configuration is copied to the staged configuration (block 1216). The system then removes entries from the stage-level social media candidate set table with an associated ingesting Content Source ID (block 1218), and the search operations are selectively replaed (block 1220). In particular, the system may replay a search for every row in a live "Search Terms" table for ingesting content source ID, and may store results in a Stage Social Media Candidate Set table. The system may then cause the remove stage candidate set to go "live" in the various CREs (block 1224). The CREs refresh their in-memory configuration (block 1226 and block 1228) and a resource search is performed (block 1230).

Figure 13:
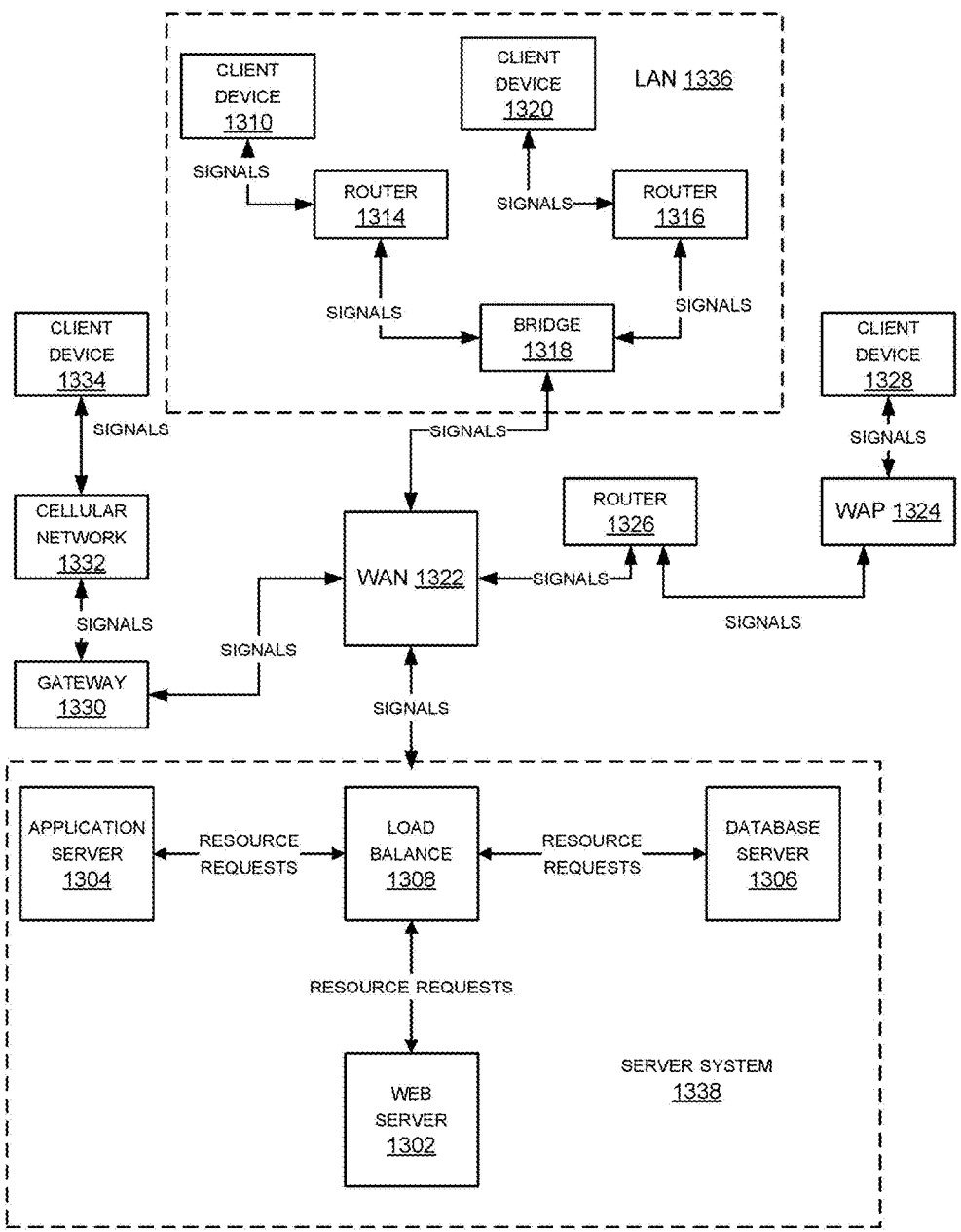
FIG. 13 machine network embodiment for implementing content recommendations influenced by trending social media.

A content recommendation system as described herein may be implemented in one embodiment by the machine system illustrated in FIG. 13. Several network access technologies between client devices and server resources are illustrated, including cellular network 1332, LAN 1336, and WAP 1324. Signals representing server resource requests are output from client devices 1310, 1320, 1328, and 1334 to the various access networks, from which they are propagated to a WAN 1322 (e.g., the Internet) and from there to a server system. These signals are typically encoded into standard protocols such as Internet Protocol (IP), TCP/IP, and HTTP. When the clients are part of a LAN 1336, the signals may be propagated via one or more router 1314 1316 and a bridge 1318. A router 1326 may propagate signals from the WAP 1324 to the WAN 1322. A gateway 1330 may propagate signals from the cellular network 1332 to the WAN 1322. The server system 1338 in this example comprises a number of separate server devices, typically each implemented in the separated machine, although this is not necessarily the case. The signals from the client devices are provided via a load balancing server 1308 to one or more application server 1304 and one or more database server 1316. Load balancing server 1308 maintains an even load distribution to the other server, including web server 1302, application server 1304, and database server 1306. Each server in the drawing may represent in effect multiple servers of that type. The load balancing server 1308, application server 1304, and database server 1306 may collectively implement a content recommendation system as described herein. The signals applied to the database server 1306 may cause the database server 1306 to access and certain memory addresses, which correlates to certain rows and columns in a memory device. These signals from the database server 1306 may also be applied to application server 1304 via the load balancing server 1308. Signals applied by the application server 1304, via the load balancing server 1308, to the web server 1302, may result in web page modifications which are in turn communicated to a client device, as described herein in regards to user interface and interaction signals to and from a client device. The content recommendation system described herein may thus be implemented as devices coordinated on a LAN, or over a wide geographical area utilizing a WAN or cellular network, or over a limited area (room or house or store/bar) utilizing a WAP. Features of client logic to receive recommendations may thus be implemented, for example, as an application (app) on a mobile phone interfacing to a network in one of the manners illustrated in this figure. The content recommendation system described herein may be implemented as a pure or hybrid peer to peer system in a local or widely distributed area.

Figure 14:
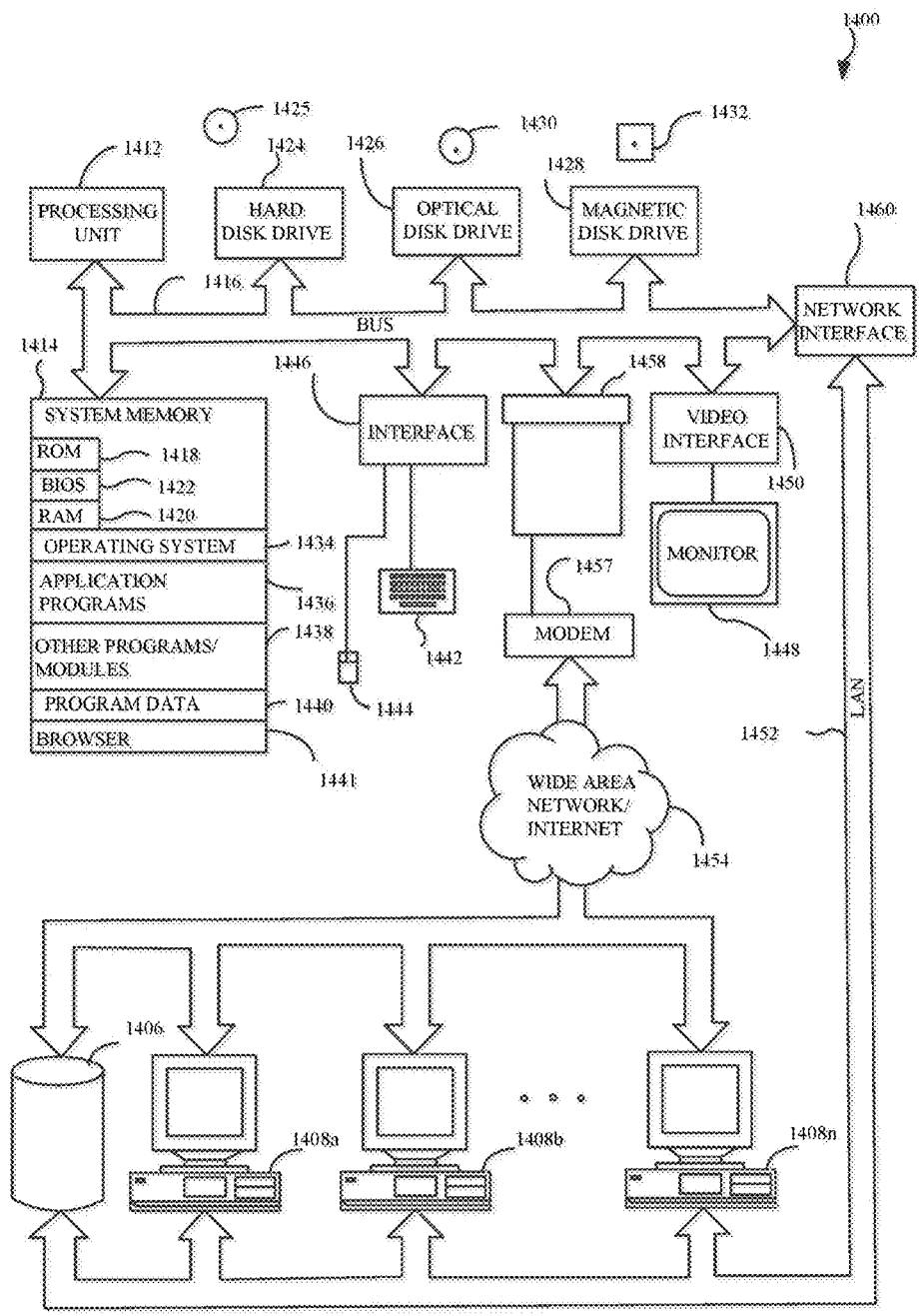
FIG. 14 machine network embodiment 1400 for implementing aspects of a content recommendation system influenced by trending social media.

FIG. 14 illustrates an embodiment of a computer system machine and a machine communication network. The computer system 1400 may implement an embodiment of a content recommendation engine, or social media server, or any component thereof, as described herein. A particular computer system 1400 of the machine network may include one or more processing units 1412, a system memory 1414 and a system bus 1416 that couples various system components including the system memory 1414 to the processing units 1412. The processing units 1412 may be any logic processing unit, such as one or more central processing units (CPUs), digital signal processors (DSPs, application-specific integrated circuits (ASICs), field programmable gate arrays (FPGAs), etc. The system bus 1416 can employ any known bus structures or architectures, including a memory bus with memory controller, a peripheral bus, and a local bus. The system memory 1414 includes read-only memory (ROM) 1418 and random access memory (RAM) 1420. A basic input/output system (BIOS) 1422, which can form part of the ROM 1418, contains basic routines that help transfer information between elements within the computer system 1400, such as during start-up.

The computer system 1400 may also include a plurality of interfaces such as network interface 1460, interface 1458 supporting modem 1457 or any other wireless/wired interfaces.

The computer system 1400 may include a hard disk drive 1424 for reading from and writing to a hard disk 1425, an optical disk drive 1426 for reading from and writing to removable optical disks 1430, and/or a magnetic disk drive 1428 for reading from and writing to magnetic disks 1432. The optical disk 1430 can be a CD-ROM, while the magnetic disk 1432 can be a magnetic floppy disk or diskette. The hard disk drive 1424, optical disk drive 1426 and magnetic disk drive 1428 may communicate with the processing unit 1412 via the system bus 1416. The hard disk drive 1424, optical disk drive 1426 and magnetic disk drive 1428 may include interfaces or controllers (not shown) coupled between such drives and the system bus 1416, as is known by those skilled in the relevant art. The drives 1424, 1426 and 1428, and their associated computer-readable storage media 1425, 1430, 1432, may provide non-volatile and non-transitory storage of computer readable instructions, data structures, program modules and other data for the computer system 1400. Although the depicted computer system 1400 is illustrated employing a hard disk 1424, optical disk 1426 and magnetic disk 1428, those skilled in the relevant art will appreciate that other types of computer-readable storage media that can store data accessible by a computer may be employed, such as magnetic cassettes, flash memory, digital video disks (DVD), Bernoulli cartridges, RAMs, ROMs, smart cards, etc. For example, computer-readable storage media may include, but is not limited to, random access memory (RAM), read-only memory (ROM), electrically erasable programmable read-only memory (EEPROM), flash memory, compact disc ROM (CD-ROM), digital versatile disks (DVD) or other optical disk storage, magnetic cassettes, magnetic tape, magnetic disk storage or other magnetic storage devices, solid state memory or any other medium which can be used to store the desired information and which may be accessed by processing unit 1412.

Program modules can be stored in the system memory 1414, such as an operating system 1434, one or more application programs 1436, other programs or modules 1438 and program data 1440. Application programs 1436 may include instructions that cause the processor(s) 1412 to automatically provide dynamic selection of data and telecommunication service providers before or during communications between various devices such as, for example, a mobile device and a landline telephone. Other program modules 1438 may include instructions for handling security such as password or other access protection and communications encryption. The system memory 1414 may also include communications programs, for example, a Web client or browser 1441 for permitting the computer system 1400 to access and exchange data with sources such as Web sites of the Internet, corporate intranets, extranets, or other networks and devices as described herein, as well as other server applications on server computing systems. The browser 1441 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of Web clients or browsers are commercially available such as those from Mozilla, Google, and Microsoft.

Although illustrated as being stored in the system memory 1414, the operating system 1434, application programs 1436, other programs/modules 1438, program data 1440 and browser 1441 can be stored on the hard disk 1425 of the hard disk drive 1424, the optical disk 1430 of the optical disk drive 1426 and/or the magnetic disk 1432 of the magnetic disk drive 1428.

An operator can enter commands and information into the computer system 1400 through input devices such as a touch screen or keyboard 1442 and/or a pointing device such as a mouse 1444, and/or via a graphical user interface. Other input devices can include a microphone, joystick, game pad, tablet, scanner, etc. These and other input devices are connected to one or more of the processing units 1412 through an interface 1446 such as a serial port interface that couples to the system bus 1416, although other interfaces such as a parallel port, a game port or a wireless interface or a universal serial bus (USB) can be used. A monitor 1448 or other display device is coupled to the system bus 1416 via a video interface 1450, such as a video adapter. The computer system 1400 can include other output devices, such as speakers, printers, etc.

The computer system 1400 can operate in a networked environment using logical connections to one or more remote computers and/or devices. For example, the computer system 1400 can operate in a networked environment using logical connections to one or more mobile devices, landline telephones and other service providers or information servers. Communications may be via a wired and/or wireless network architecture, for instance wired and wireless enterprise-wide computer networks, intranets, extranets, telecommunications networks, cellular networks, paging networks, and other mobile networks. Communication may take place between the computer system 1400 and external devices via a WAN 1454 or LAN 1452. External devices may include other computer system 1408a-n (collectively, 1408) and external storage devices 1406.

The techniques and procedures described herein may be implemented via logic distributed in one or more computing devices. The particular distribution and choice of logic may vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:
1. A content recommendation system, comprising:
a content recommendation engine comprising an interface to a plurality of client devices;
a trend detector coupled between the content recommendation engine, a first search engine, and a social media hosting system;
the trend detector comprising an ordered chain of term enhancers to transform trending terms captured from the social media hosting service into enhanced terms by applying a chain of term enrichment modules including cleanse type enrichment module, word separation type enrichment module, and context search enrichment module, wherein a term enrichment objects implemented as an ordered list invoked by a service trenders, wherein the service trenders have an associated unique ID for tracking the source of search term;
the ordered chain of term enhancers coupled to utilize a content title association file and a raw term association map for transforming the trending terms into enhanced terms, wherein a raw term associator is configured to map hashtags to expanded phrases, associate the expanded phrases with search engine field types, and control the interrupt control;
the trend detector further comprising time-framing snapshot logic to control a switch on acquisition of the trending terms from the social media hosting service;
the trend detector adapted to apply the enhanced terms to the search engine;

the content recommendation engine adapted to receive a search result set corresponding to the enhanced terms back from the search engine; and the content recommendation engine transforming the search result set into machine operable content and display for selection controls by operation of client device and communicating the controls to the plurality of connected client devices via a third logic interface, wherein the transformation of the search result set operates cooperatively with the time-framing snapshot logic to control the switch.

2. The content recommendation system of claim 1, further comprising:

the ordered chain of term enhancers comprising an ordered list of logic modules coupled as a closed signal loop with the trend detector.

3. The content recommendation system of claim 2, further comprising:

an interrupt control operable via the first logic interface and coupled to activate and deactivate the ordered list of logic modules.

4. The content recommendation system of claim 3, further comprising:

an accumulator comprising a fixed size LRU queue memory structure coupled to the ordered list of logic modules.

5. The content recommendation system of claim 4, further comprising:

the accumulator configured to be responsive to a reset signal generated when the accumulator has lost state; and the accumulator configured to clear the fixed size LRU queue memory structure in response to the reset signal.

* * * * *